United States Patent [19]

Messing

[11] 3,868,304

[45] Feb. 25, 1975

[54] METHOD OF MAKING FRUCTOSE WITH IMMOBILIZED GLUCOSE ISOMERASE

[75] Inventor: Ralph A. Messing, Horseheads, N.Y.

[73] Assignee: Corning Glass Works, Corning, N.Y.

[22] Filed: Feb. 16, 1973

[21] Appl. No.: 332,739

[52] U.S. Cl.................. 195/31 F, 195/63, 195/68, 195/DIG. 11
[51] Int. Cl............................................ C12d 13/00
[58] Field of Search............ 195/31 F, DIG. 11, 63, 195/68

[56] References Cited
UNITED STATES PATENTS

| | | | |
|---|---|---|---|
| 3,705,084 | 12/1972 | Reynolds | 195/68 |
| 3,708,397 | 1/1973 | Sipos | 195/68 |
| 3,783,101 | 1/1974 | Tomb et al. | 195/DIG. 11 |

OTHER PUBLICATIONS

Chem. Abstracts, 74:605d.

*Primary Examiner*—Alvin E. Tanenholtz
*Assistant Examiner*—Thomas G. Wiseman
*Attorney, Agent, or Firm*—James A. Giblin; Clarence R. Patty, Jr.

[57] ABSTRACT

Method of converting glucose to fructose which comprises incubating a glucose-containing solution with an immobilized enzyme composite comprising glucose isomerase adsorbed within the pores of a porous alumina body having an average pore diameter between about 100 and 1000A.

17 Claims, No Drawings

METHOD OF MAKING FRUCTOSE WITH IMMOBILIZED GLUCOSE ISOMERASE

Related Application:

United States Patent Application Serial No. 332,807, filed of even date herewith in the name of R. A. Messing and entitled, "Enzymes Immobilized on Porous Inorganic Support Materials".

BACKGROUND OF THE DISCLOSURE

1. Field of the Invention

This invention relates generally to the field of immobilized enzyme systems and in particular to an immobilized glucose isomerase composite useful for the preparation of fructose. Fructose is an isomer of glucose having about twice the sweetening property. Since fructose can impart the same degree of sweetness at about half the amount of glucose, fructose is especially useful in applications requiring sweetening at minimal caloric intake. Accordingly, the desirability of economically producing fructose is well recognized. It has long been known that glucose can be partially isomerized to fructose by heating a glucose solution in the presence of an alkali catalyst or by subjecting the glucose solution to the catalytic action of certain enzymes. The enzymes which may be used are derived from various organisms but, because of their specificity in being able to catalyze the isomerization of glucose to fructose, they are commonly referred to as glucose isomerase, regardless of the enzyme source. As used herein, glucose isomerase refers to any such enzymes.

2. Prior Art

The alkaline isomerization of glucose to fructose has been generally unsatisfactory because of the tendency of the non-selective alkaline catalysts to produce undesirable by-products which are difficult to remove. Among the known undesirable products of alkaline isomerization are various color bodies and acidic products, both of which require added processing steps for removal. Some of the disadvantages associated with alkaline isomerization have been overcome by the recent discovery that finely-divided alumina may be used in an alkaline environment to isomerize glucose. See U.S. Pat. No. 3,432,253. By using an alkaline alumina (> pH 7) having a large surface area, it has been found possible to avoid the formation of objectionable by-products. A further advantage disclosed is that by using solid alumina particles, the alumina can be easily removed from the reaction mixture and re-used. Unfortunately, however, the use of finely-divided alumina as a catalyst requires a relatively long residence time for the glucose, thus tending to preclude more economical continuous or flow-through reactions. Further, because of a suspected equilibrium which appears to exist between fructose and glucose, the optimum conversion of glucose to fructose is severely limited under the batch-type reaction conditions disclosed in the above patent.

Because of the noted limitations associated with known methods of alkaline isomerization, attention has also been directed toward enzymatic isomerization methods. The enzymatic conversion of glucose to fructose merely requires incubating a glucose-containing solution with a glucose isomerase under isomerizing conditions (e.g., at appropriate temperature, pH, with various additives, etc.). Since glucose isomerase is highly specific in the type of reaction it promotes (isomerization), and because of the extremely high catalytic value of enzymes in general, the use of glucose isomerase has been examined by various researchers with the hope of providing a commercially feasible enzymatic method for producing fructose.

One of the earliest disclosures describing the enzymatic isomerization of glucose can be found in U.S. Pat. No. 2,950,228. In some cases, however, it has been found that even with the highly specific enzymatic isomerization, the fructose product may still contain various objectional color bodies. One method of avoiding or at least minimizing the formation of such color bodies is disclosed in U.S. Pat. No. 3,623,953 wherein it is disclosed that the addition of various sulfite salts to the isomerization solution minimizes color body formation while at the same time enhancing the stability of the glucose isomerase.

The use of enzymes for large scale chemical processes has generally been limited, however, mainly due to the high cost of the enzymes which, being soluble in water, are difficult to remove after use. Thus, enzymes can usually be used only once and they are frequently a part of the final product because of the costs associated with removal.

In recent years, however, techniques have been devised to "immobilize" or "insolubilize" various enzymes by adsorbing or chemically coupling them to essentially insoluble carrier materials, thus permitting easy removal of the resulting enzyme composites. Enzymes have been bonded to organic materials such as various cellulose derivatives, polyaminopolystyrene beads, etc. and various inorganic materials such as porous glass and silica xerogels. In many applications, inorganic carrier materials are preferred to organic materials because of their greater rigidity, non-swellability, and thermal stability. Methods for adsorbing various enzymes to various siliceous materials can be found in U.S. Pat. No. 3,556,945 and methods for chemically coupling enzymes to inorganic carriers may be found in U.S. Pat. No. 3,519,538. Even though various advantages have been found in adsorbing enzymes to inorganic materials, there are still some disadvantages which have hindered their use in industry. For example, a siliceous carrier such as porous glass is generally expensive to prepare. Further, porous glass, as well as siliceous xerogels, lack the alkaline durability required for long term use with an enzyme system such as glucose isomerase which has an alkaline pH optimum. Thus, considerable effort has been expended to find a better carrier material for an enzyme such as glucose isomerase which has the desirable characteristics of inorganic carriers yet lacks the disadvantages associated with known inorganic materials. Quite surprisingly, I have now found an enzyme carrier which is ideally suited for the immobilization and use of glucose isomerase.

SUMMARY OF THE INVENTION

The method of making fructose comprises contacting a glucose-containing solution with an immobilized enzyme composite comprising glucose isomerase adsorbed within the pores of porous alumina body having an average pore diameter between about 100 and 1000A. The porous alumina carrier preferably has a particle size between about 25 and 80 mesh, United States Standard Sieve, and enzyme composites using the porous alumina particles are preferably placed in a flow-through column through which a glucose-containing solution is continuously passed under isomerizing conditions. The incubation temperature is preferably between about 50° and 70°C. The reaction proceeds well with a variety of buffer systems and a pH range of 7.2 to 8.2 is preferred with pH range of 7.4 to 7.8 being especially preferred. Since the carrier consists of porous alumina, the resulting enzyme composite has excellent alkaline durability at the pH range within which the bonded glucose isomerase demonstrates optimum activity.

SPECIFIC EMBODIMENTS

A very important feature in the method of making fructose is the porous alumina carrier for the glucose isomerase. The carrier must have an average pore diameter between 100 and about 1000A to permit maximum loading of the enzyme. The lower limit of 100A is determined by the largest dimension of the glucose isomerase molecule which is very approximately 100A. The average pore size must be at least as large as 100A to permit entry of the molecule into the pores and mass diffusion of the enzyme deeply into the porous network prior to final adsorption on the inner surfaces of the carrier. Glucose isomerase is an elongate molecule. Thus, by using a porous alumina carrier having an average pore diameter at least as large as the largest dimension of the molecule (100A) entry of the molecule into the pores is assured. This permits use of the largely internal surface area for loading the enzyme.

It is important that the average pore size of the alumina carrier does not exceed about 1000A for several reasons. As the average pore size of the inorganic carrier exceeds about 1000A, there occurs a considerable decrease in surface area available for adsorbing and hence, loading the enzyme. Further, as the average pore size increases beyond about 1000A, the rigid internal structure of the pores affords less protection for the enzyme from environmental stresses which tend to detach the enzyme. For example, if the immobilized enzyme composite were used in a flow-through column, the pressure drop through the column represents one such turbulent environment which tends to detach enzymes adsorbed within the pores of carriers having an average pore size larger than about 1000A. Thus, because of the requirement of a relatively high surface area for loading the enzyme (e.g., greater than about 5 m²/g) and because of the need to protect the adsorbed enzyme from external stresses which tend to detach the enzyme, the average pore diameter of the porous alumina carrier should be no larger than about 1000A. My preferred average pore size for the porous alumina carrier is between about 140 and 220A. The physical properties of the preferred carrier are described in greater detail below.

After a porous alumina material having an average pore diameter within the range of 100 to 1000A, is prepared or acquired, it may be necessary to comminute the porous alumina to a desired mesh size which will be compatible with the reactor to be used with the immobilized glucose isomerase. When my composites are used in a plug column through which a glucose-containing solution continuously flows, the preferred carrier particle size is between about 4 and 200 mesh, United States Standard Sieve. Composite particles larger than about 4 mesh require an undue amount of time for enzyme diffusion prior to bonding, require a greater residence time for the substrate, cause substrate diffusion problems and, in general, result in an uneconomical conversion. On the other hand, when the carrier particle size is smaller than about 200 mesh, it becomes difficult to handle and retain the composite in a column and, because of consequent tighter column packing, there results are undesirably high pressure drop through the column, generally requiring reinforcing equipment. An especially preferred average carrier particle size is between about 25 and 80 mesh and carriers having an average particle size within that range were used in the experiments below.

After the porous alumina bodies have been ground and sieved to the desired particle size, they are hydrated or pre-conditioned with a suitable buffer or salt system—hydration at a pH of 7.0 is preferred for the alumina carrier. The buffer system external to the pores is then removed but the porous alumina bodies are kept wet prior to the adsorption step.

The glucose isomerase (in solution) is then added to the wet carrier at a concentration per unit weight of porous alumina carrier which will permit optimum adsorption (loading) of the glucose isomerase. The adsorption process is facilitated by stirring, circulation, inversion, use of a fluidized bed reactor containing the carrier, or other known means suitable for forming an agitated reaction environment which encourages mass diffusion of the enzyme through the pores. The time required for optimum adsorption depends, of course, on the carrier particle size, the size of the enzyme vis-a-vis the average pore size, and other factors such as temperature and pH, but the adsorption steps should be for at least about one-half hour. For the adsorption of glucose isomerase within the pores of porous alumina having an average pore size of about 175A, I have found that an adsorption period of about 1½ to 5 or 6 hours is satisfactory for assuring maximum adsorption. The adsorption proceeds well in a pH range of 6.9 to 9.0 but is preferably accomplished at a pH of 7.1 to 8.5.

After adsorption, any loosely held enzyme is removed by washing the composite in water, saline solution (e.g., 0.5M NaCl), or any other washing medium which will have no detrimental effect on the carrier or attached enzyme.

In use, the enzyme composite may be placed in a column, continuous stirred tank reactor, fluidized bed reactor, or any other vessel into which or through which the substrate solution can be introduced for incubation with the enzyme composite. In the examples below, the glucose isomerase-alumina composites were placed in columns through which glucose-containing solutions flowed under incubating conditions. A continuous process is preferred for economy reasons and a plug flow-through column is the preferred reactor. The column may be jacketed with a water bath to maintain an optimum incubation temperature and/or a temperature which maximizes the half life of the enzyme composite. I have found that an incubation temperature of between about 50°-70°C., preferably 60°C., not only assures efficient conversion of glucose to fructose, but also permits a long enzymatic half life for the composite. Preferably, the substrate solution contains at least about 45 percent glucose, by weight.

The incubation pH range and buffer system depends on the enzyme system and reaction conditions. I have found that for my composites, the reaction proceeds well at a pH between about 7.2 and 8.2 with a pH range of 7.4 to 7.8 being especially preferred. Generally, the choice of buffer systems depends on the degree of acidity found in the substrate solution caused by the solution itself and/or the presence of various activating ions which may be added to the substrate and the internal environment of the pores. For example, when a glucose-containing solution (e.g., 50 percent glucose) is incubated with my glucose isomerase composite, small amounts of cobalt and magnesium ions may be added to the substrate before it contacts the enzyme composite. The acidic effects of these ions may be overcome by the addition of sulfite salts which also serve to enhance composite stability. The various buffer systems which can be used for glucose isomerase are thought to be known or they can be readily determined by one experienced in the art.

In the examples below, glucose isomerase from two different sources was used to prepare the composites and the results were comparable as to long term stability and half life. The composites were assayed under standard conditions for glucose isomerase in a batch reactor. The results are in International Glucose Isomerase Units (IGIU) where an IGIU is the amount of enzyme necessary to convert 1 $\mu$ mole of glucose to fructose per minute at 60°C. and pH 6.85. The carrier and composites were prepared as described in detail below and the long term stability and half life of the composites were determined. Experiments were performed to compare the efficiency of the composites with composites consisting of glucose isomerase chemically coupled to an inorganic carrier. Further, a separate experiment was performed to determine what effect, if any, the alumina carrier per se has on the isomerization process.

The preferred carrier used for the glucose isomerase in the following examples had the following properties:

Characteristics of Porous Alumina Carrier

| | |
|---|---|
| Average Pore Size (A) | 175 |
| Minimum Pore Size (A) | 140 |
| Maximum Pore Size (A) | 220 |
| Surface Area (m$^2$/g) | 100 |
| Pore Volume (cm$^3$/g) | 0.6 |
| Porosity | 62.5% |
| Particle Size (mesh) | 25–60 |

The pore size distribution was determined by conventional methods and found to be very close to the average pore size (e.g., 90 percent within ± 25 percent of 175A).

EXAMPLE I

A crude glucose isomerase preparation consisting of about 444 IGIU/g derived from a Streptomyces organism was used for the adsorption step. About 5 grams of the glucose isomerase preparation was added to 28.7 ml. of 0.1M magnesium acetate solution in a 50 ml. beaker.

The slurry was stirred for 25 minutes at room temperature and then filtered through filter paper. The residue on the paper was washed with 14.3 ml. of 0.1M magnesium acetate followed by washes with 14 ml. of 0.5M NaHCO$_3$ and 4.3 ml. of 0.5M NaHCO$_3$. The washes were collected directly into the original enzyme filter. The total volume of the enzyme-wash solution (filtrate) was 50 ml.

Five hundred milligrams of porous alumina bodies were placed in a 50 ml. round bottom flask. Ten milliliters of the above glucose isomerase solution was then added to the flask. The flask was attached to a rotary evaporator. Vacuum was applied to the apparatus and the flask was rotated in a bath maintained between 30° and 45°C. over a 25-minute interval. An additional 10 ml. of glucose isomerase solution was then added to the flask, and evaporation was continued over the next 35-minute interval under the same conditions. This addition and evaporation was carried out over a 4-hour period under the same conditions. The procedure was repeated two more times with separate 10 ml. glucose isomerase solutions. A final 7 ml. aliquot of glucose isomerase solution was then added to the flask and evaporation was continued for an additional 1-hour and 10-minutes at 45°C. The flask and contents were removed from the apparatus and placed in a cold room over the weekend. A total of 47 ml. of glucose isomerase solution had been added to the alumina.

Fifty milliters of buffer (0.01M sodium maleate, pH 6.8 to 6.9, containing 0.001M cobalt chloride and 0.005 magnesium sulfate) was added to the composite and the sample was extracted over the next hour at room temperature. The extract, volumne 50 ml., was saved for assay. The composite was then washed with 200 ml. of water, followed by 10 ml. of 0.5M sodium chloride. The final wash was performed over a fritted glass funnel with 50 ml. of water. The composite was then transferred to a 50 ml. Erlenmeyer Flask and stored in buffer at room temperature with periodic assays of the total sample over a 106-day interval.

RESULTS

Enzyme extract assay (50 ml.) — 39.8 IGIU per ml. (enzyme activity recovery in extract — 90 percent).

Composite average assay value — 130 IGIU per 500 milligram sample (enzyme activity recovery on composite — 6 percent).

Average loading value — 260 IGIU per gram.

The storage stability determinations over the 106-day interval involved 21 periodic assays in which 16 assays on the same sample indicated an activity between 100 and 150 IGIU per 500 mg or 200–300 IGIU/gram.

EXAMPLE II

To determine the long term stability and enzymatic half life of the composite, another sample was prepared for use in a flow-through column through which a glucose-containing solution flowed under conditions which would be encountered in an industrial application. The above-described alumina bodies (175A average pore size, 25–60 mesh) were pre-treated as follows:

Eleven grams of porous alumina bodies were transferred to a 100 ml. glass stoppered cylinder. One hundred milliliters of 0.05M magnesium acetate, 0.01M cobalt acetate, pH 7.5, were added to the alumina bodies. The cylinder was stoppered, the contents gently mixed by inversion, and placed in a 60°C. bath after inversion. After 15 minutes of reaction, the cylinder was inverted and the fluid was decanted. One hundred milliliters of fresh magnesium-cobalt acetate (described above) was added to the cylinder, inverted, and allowed to stand at room temperature for 2 ½ hours.

A crude glucose isomerase solution from the same source as above and consisting of 590 IGIU per ml. in 0.6M saturated ammonium sulfate was purified for reaction with the alumina as follows:

To 40 ml. of the glucose isomerase solution in a beaker, an additional 1.4 grams of ammonium sulfate was added to precipitate the enzyme and the slurry was stirred at room temperature for 20 minutes. The sample was then centrifuged at 16,000 RPM at 2°C. for 30 minutes. The supernatent fluid was decanted and discarded. Twelve milliliters of the magnesium-cobalt acetate solution (described above) was added to the precipitate and stirred, and then 3 ml. of 0.5M sodium bicarbonate was added to the enzyme solution and mixed to dissolve the enzyme. The solution was placed in a 60°C. water bath for 15 minutes. After removal from the bath the solution was centrifuged for 15 minutes at 16,000 RPM and 2°C. The clear supernatent enzyme solution was decanted and the precipitate was discarded. The enzyme solution (volume 28 ml.) was found to have a pH of 7.5. If no activity was lost during the purification procedure, this solution should have contained 23,600 IGIU.

PREPARATION OF COMPOSITE

The magnesium-cobalt acetate solution was decanted from the porous alumina bodies after inversion. The enzyme solution, 28 ml., was added to the porous alumina in the cylinder. The cylinder was stoppered, mixed by inversion, and then placed in a 60°C. water bath. The enzyme was permitted to react with the porous alumina (11 g) over a 2-hour and 30-minute interval at 60°C. During this period the cylinder was inverted every 15 minutes. After removal from the 60°C. bath, reaction was continued at room temperature with inversion at 30-minute intervals over the next 2-hour period. The reaction was continued without inversion overnight at room temperature. The enzyme solution was decanted (volume 28.5 ml., pH 7.1) and saved for assay. The composite was washed with 60 ml. of distilled water, followed by 40 ml. of 0.5M sodium chloride, and finally by 40 ml. of the magnesium-cobalt acetate solution. Three samples (totaling 1 g) were removed from the batch for the assay determinations. The remaining 10 grams were transferred to a column, thermostated at 60°C. The column was fed with a solution containing 50 percent glucose and 0.005M magnesium sulfate, buffered with sodium sulfite to a pH of 7.7 to 8.0. During the initial 26 hours, 0.001M cobalt chloride was incorporated into the feed of the column. After 26 hours the cobalt was no longer included in the feed and the only activator present was magnesium ions during the remainder of the column life. The initial flow rate of the column was approximately 190 ml. per hour. The fructose conversion was maintained between 80 and 85 percent of theoretical by reducing the flow rate over various intervals of time. The column was run for approximately 31 days. At this time, due to a shortage of feed, the column dried out completely and was dry for approximately 15 hours. An approximate value for the composite half life was obtained by calculating the amount of product collected and the conversion of the product in the collecting vessel. The projected half life for the composite was found to be about 42 days. An assay of the product prior to use indicated a loading of 381 IGIU per gram. This represents an activity recovery of 17.8 percent of the total IGIU's exposed to the carrier. An assay of the reacted enzyme solution (28.5 ml.) indicated 161 IGIU per ml., an activity recovery in the reacted enzyme solution of about 19.4 percent. The pH of the column had been maintained

EXAMPLES III – X between 7.4 and 7.8 by appropriate adjustment of the feed. Total column loading was 3810 IGIU.

To determine the effect of various buffer systems on the half life of the composite a series of eight columns was run. In each case the glucose isomerase was adsorbed to the porous alumina described above (175A average pore size, 25–60 mesh). The enzyme used was from two sources. Examples III and IV consisted, as in Examples I and II, of a glucose isomerase solution derived from a Streptomyces organism (source A). Examples V through X consisted of another glucose isomerase solution consisting of 1000 IGIU/ml. derived from another Streptomyces organism (source B). The adsorption process was similar to that of Example II. Ten grams of composite was placed in each column. A 50 percent glucose substrate solution with the indicated buffer systems was flowed through each column at the initial flow rates indicated and these flow rates were adjusted periodically to maintain about an 84 percent (theoretical being 100 percent or a final product of 50—50 glucose-fructose solution) conversion rate. An 84 percent conversion was maintained by lowering the flow rate as needed. All substrate solutions and the columns were thermostated to 60°C. and the pH was held constant at pH 7.8. The enzyme loading of each column, in IGIU per gram composite, is given in mean values with upper and lower 95 percent confidence limits. Loading efficiency of enzyme to carrier in each example is also indicated. Loading efficiency refers to the ratio (in percent) of IGIUs adsorbed on the total amount of carrier to the initial number of IGIUs used for the adsorption process.

TABLE

| Example | Enzyme Source | Loading IGIU/g LCL | Loading IGIU/g Mean | Loading IGIU/g UCL | Percent Loading Efficiency | Substrate Additions (M) | Flow Rate ml/hr. (initial) | Half Life (Days) |
|---|---|---|---|---|---|---|---|---|
| III | A | 554 | 573 | 591 | 76.5 | 0.004 MgSO$_4$ 0.001 CoCl$_2$ | 122 | 49.0 |
| IV | A | 510 | 563 | 616 | 70.8 | 0.004 Na$_2$SO$_3$ 0.005 MgCl$_2$ 0.001 CoCl$_2$ | 112 | 23 |
| V | B | 164 | 206 | 248 | 36.5 | 0.004 NH$_4$HCO$_3$ 0.005 MgCl$_2$ 0.001 CoCl$_2$ | 45 | 47.0 |
| VI | B | 176 | 192 | 209 | 32.3 | 0.004 Na$_2$SO$_3$ 0.005 MgCl$_2$ 0.001 CoCl$_2$ | 38 | 17.0 |
| VII | B | 179 | 204 | 229 | 39.9 | 0.004 NH$_4$HCO$_3$ 0.005 MgCl$_2$ 0.004 NH$_4$HCO$_3$ No Co$^{++}$ | 48 | 18.0 |
| VIII | B | 372 | 407 | 441 | 49.2 | 0.005 MgSO$_4$ | 74 | 38.0 |

TABLE — Continued

| Example | Enzyme Source | Loading IGIU/g | | | Percent Loading Efficiency | Substrate Additions (M) | Flow Rate ml/hr. (initial) | Half Life (Days) |
|---|---|---|---|---|---|---|---|---|
| | | LCL | Mean | UCL | | | | |
| IX | B | 268 | 398 | 528 | — | 0.001 $CoCl_2$<br>0.004 $Na_2SO_3$<br>0.005 $MgCl_2$<br>0.004 $NH_4HCO_3$ | 74 | 23.0 |
| X | B | 372 | 407 | 441 | 49.2 | No $Co^{++}$<br>0.005 $MgSO_4$<br>0.001 $CoCl_2$<br>0.004 $Na_2HPO_3$<br>0.001 $Na_3PO_4$ | 36 | 20.0 |

EXAMPLE XI

The half lives of the composites in Examples II through X compared favorably with or exceeded the half life of an enzyme composite consisting of glucose isomerase chemically coupled to a coated porous glass carrier used under similar conditions. The chemically coupled glucose isomerase was prepared in accordance with the directions given in U.S. Pat. Application Ser. No. 227,205, entitled "Improved Enzyme Carriers," now U.S. Pat. No. 3,783,101 and assigned to the present assignee. The carrier was zirconia coated porous glass to which the enzyme from source A was chemically coupled. The material was assayed in a batch reactor under standard conditions and found to have an activity of 1068 IGIU/gram. The assay solution was 2M glucose containing 0.02M $MgSO_4$ and 0.001M $CoCl_2$.

A column containing 10.2 g (dry weight) of the above chemically coupled enzyme composite was operated for 18 days at 60°C. A solution of 50 percent glucose was fed through the column at a constant rate of 124 to 131 ml./hr. The activity in the column at a given time was calculated from an empirical expression relating conversion (percent fructose) and feed rate at the specified column conditions to activity as measured by the standard assay. The fructose percentage was measured with a Bendix automatic polarimeter at twelve intervals from 3 to 431 hours showing an activity decline of 934 to 473 IGIU/gram of composite. The estimated half life was found to be 16.6 days with a 95 confidence range of 14.8 to 18.8 days. For the initial 24 hours, the feed was 50 percent (by weight) glucose solution containing 0.005M $MgSO_4$, 0.004M $Na_2SO_3$, and 0.001M $CoCl_2$ at pH 7.8. The feed composition was charged for the remainder of the operation by eliminating the $CoCl_2$ with the other constituents maintained at their previous levels.

From the above comparison, the higher value of the composite comprising the glucose isomerase adsorbed to the porous alumina bodies is apparent. Beside the advantage of having a higher half life under similar operational conditions, the adsorbed isomerase system is significantly less expensive to prepare due to lower cost carrier materials and a lower number of processing steps.

EXAMPLE XII

Because it was known from the disclosure in U.S. Pat. No. 3,431,253 that basic alumina granules can be used alone for the conversion of glucose to fructose, the following experiment was performed to determine what contribution, if any, the porous alumina bodies made in the column studies of Examples II through X where the alumina was used as a carrier for the adsorbed glucose isomerase. A column was run using 11 g of the porous alumina treated with 0.05M magnesium acetate and 0.01M cobalt acetate at 60°C. for 15 minutes, duplicating the treatment used prior to the adsorption steps for preparing the composites.

The treated porous alumina was placed in a column thermostated at 60°C. A feed containing 0.005M $MgSO_4$, 0.004M $Na_2SO_3$, 0.001M $CoCl_2$ and 50 percent by weight glucose at a pH of 7.8 was run through the column at a constant flow rate of about 45 ml/hr. (An adsorbed glucose isomerase composite which assayed at 277 IGIU/g when run under identical conditions yielded an 84 percent theoretical conversion of glucose to fructose.) A sample of the eluate from the column containing only the alumina was collected daily and measured with a polarimeter to determine percent conversion to fructose using the feed solution to zero the instrument. The pH of the product was also monitored. The results are summarized below.

| Day | Flow Rate (ml/hr.) | Fructose (%*) | Product (pH) |
|---|---|---|---|
| 1st | 43.8 | 4.8 | 5.4 |
| 2nd | 47.0 | 0.0 | 6.4 |
| 3rd | 47.0 | 0.0 | 7.5 |
| 4th | 47.0 | 0.0 | 7.5 |

*theoretical

To determine the percent conversion due to heating the feed, another column was run at 60°C. with a flow rate of 45 ml/hr. but containing no alumina or composite. The conversion was found to be 0.5 percent and the product pH was 7.45. From the above examples, it can be concluded that little or no conversion of glucose to fructose can be attributed to the alumina per se and it is thought that the alkaline isomerization of glucose to fructose using finely-divided or porous alumina would require a much longer residence time to demonstrate any appreciable conversion.

From the above examples, it is clear that the immobilized glucose isomerase composite of this disclosure offers a very efficient and inexpensive method for large scale conversion of glucose to fructose. Since the preparation or use of the composite described herein is subject to numerous variations within the scope of the invention, it is intended that the above examples should be considered as illustrative and not in a limiting sense.

I claim:

1. A method of making fructose which comprises incubating a glucose solution with an immobilized enzyme composite comprising glucose isomerase adsorbed on the inner surfaces and within the pores of a porous alumina body having an average pore diameter between about 140A and 220A.

2. The method of claim 1 wherein the glucose solution is buffered to a pH between 7.2 and 8.2 prior to incubation.

3. The method of claim 2 wherein the glucose solution is maintained at a pH between about 7.4 and 7.8.

4. The method of claim 2 wherein the composite is contained in a flow-through column into which the glucose solution is continuously introduced for incubation.

5. The method of claim 4 wherein the column is thermostated to a temperature between about 55° and 70°C.

6. The method of claim 1 wherein the alumina body has a mesh size of between about 25 and 60 mesh, United States Standard Sieve.

7. The method of claim 6 wherein the glucose isomerase is of the type derived from a Streptomyces organism.

8. The method of claim 1 wherein the glucose solution comprises more than about 45 percent glucose by weight.

9. The method of claim 1 wherein the glucose solution contains more than 45 percent by weight glucose, and the incubation occurs in a flowthrough column containing the enzyme composite having a mesh size between about 25 and 60 mesh, United States Standard Sieve, with the column being thermostated to a temperature between 50° and 70°C and the glucose solution buffered to a pH between about 7.4 and 8.0 prior to incubation.

10. A continuous process for converting glucose to fructose which comprises continuously passing a glucose-containing solution under isomerizing conditions through a plug flow-through column containing an immobilized enzyme composite comprising glucose isomerase adsorbed on the inner surfaces of porous alumina particles having an average pore diameter between about 140A and 220A and an average particle size between about 4 and 200 mesh, United States Standard Sieve.

11. The process, as claimed in claim 10, wherein the porous alumina particles have a particle size between about 25 and 60 mesh, United States Standard Sieve.

12. The process, as claimed in claim 10, wherein the column is thermostated to a temperature between about 50° and 70°C.

13. The process, as claimed in claim 10, wherein the glucose solution comprises at least about 45 percent by weight glucose.

14. The process, as claimed in claim 10, wherein the glucose solution is buffered to a pH between about 7.2 and 8.2 prior to passage through the column.

15. The process, as claimed in claim 14, wherein the glucose is buffered to a pH between about 7.4 to 7.8.

16. The process, as claimed in claim 10, wherein the glucose isomerase is of the type derived from a Streptomyces organism.

17. The process, as claimed in claim 10, wherein the glucose solution comprises at least about 45 percent by weight glucose, the column is thermostated to a temperature between about 50° and 70°C., and the porous alumina particles have an average particle size between about 25 and 60 mesh, United States Standard Sieve.

* * * * *

UNITED STATES PATENT OFFICE
CERTIFICATE OF CORRECTION

PATENT NO. : 3,868,304
DATED : February 25, 1975
INVENTOR(S) : Ralph A. Messing

It is certified that error appears in the above-identified patent and that said Letters Patent are hereby corrected as shown below:

Column 1, line 45, "3,432,253" should be -- 3,431,253 --.

Column 5, line 48, "± 25" should be -- ± 26 --.

Column 6, line 19, "milliters" should be -- milliliters --.

Column 9, line 47, "charged" should be -- changed --.

Signed and sealed this 15th day of July 1975.

(SEAL)
Attest:

RUTH C. MASON
Attesting Officer

C. MARSHALL DANN
Commissioner of Patents
and Trademarks